Figure 1:
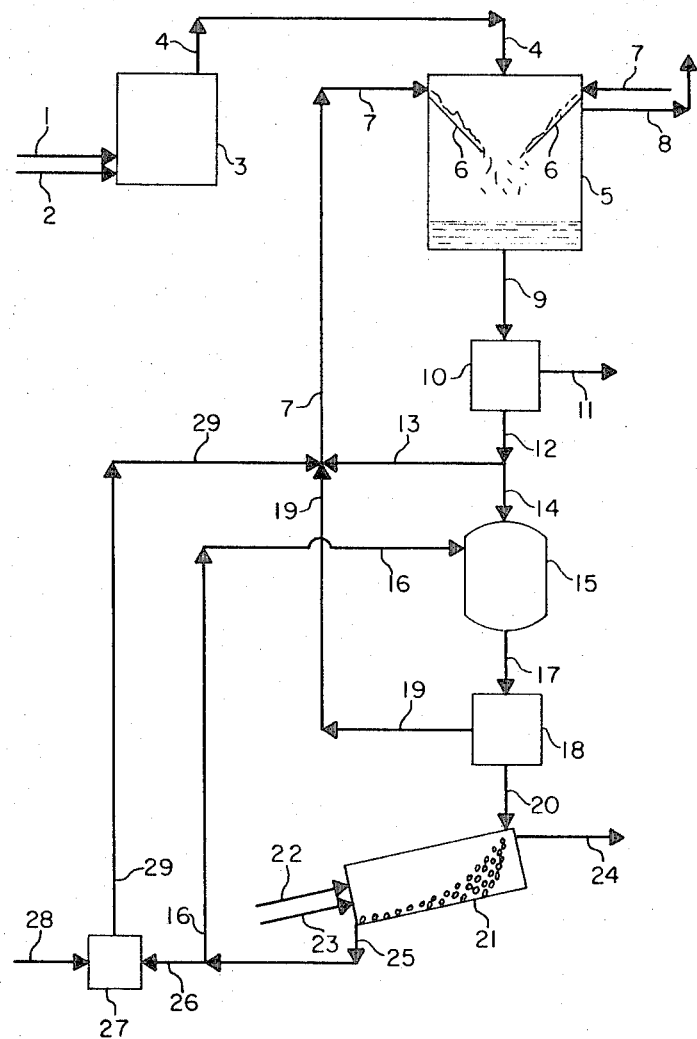

United States Patent

[11] 3,617,212

[72] Inventor Indravadan S. Shah
 Forest Hills, N.Y.
[21] Appl. No. 737,186
[22] Filed June 14, 1968
[45] Patented Nov. 2, 1971
[73] Assignee Chemical Construction Corporation
 New York, N.Y.

[54] RECOVERY OF SULFUR DIOXIDE FROM WASTE GASES
 6 Claims, 2 Drawing Figs.

[52] U.S. Cl............................................... 23/167,
 23/2, 23/178
[51] Int. Cl..................................................... C01b 17/56,
 C01b 17/72
[50] Field of Search....................................... 23/2, 129,
 130, 131, 167, 177, 178, 186

[56] References Cited
 UNITED STATES PATENTS

| | | | |
|---|---|---|---|
| 2,161,056 | 6/1939 | Johnstone et al. | 23/178 S |
| 2,452,517 | 10/1948 | Broughton | 23/179 X |
| 2,922,735 | 1/1960 | Johnstone | 23/178 X |
| 3,085,858 | 4/1963 | Trubey et al. | 23/130 |
| 3,475,121 | 10/1969 | Thornton | 23/178 |
| 3,477,815 | 11/1969 | Miller et al. | 23/178 |
| 3,273,961 | 9/1966 | Rogers et al. | 23/130 X |
| 3,309,262 | 3/1967 | Copeland et al. | 23/131 X |

Primary Examiner—Oscar R. Vertiz
Assistant Examiner—Charles B. Rodman
Attorney—J. L. Chaboty ABSTRACT: A process is provided to efficiently and economically absorb and recover sulfur dioxide gas, and thus eliminate air pollution and produce a useful sulfur-containing product. Sulfur dioxide is recovered from a waste gas stream, such as the flue gas from a power boiler which burns sulfur-containing coal or other fuel, by scrubbing the waste gas stream with an aqueous solution of magnesium bisulfite-magnesium sulfite, Sulfur dioxide is absorbed into the aqueous scrubbing solution by reacting with magnesium sulfite to form magnesium bisulfite in solution. The resulting solution is divided into two portions. Magnesium hydroxide is added to the first portion at a controlled rate, to convert magnesium bisulfite to magnesium sulfite. The first portion is then recycled for further waste gas scrubbing. The magnesium sulfite and magnesium bisulfite content of the second solution portion are processed at elevated temperature to produce magnesium oxide and a gas stream of high sulfur dioxide content, usually about 10 percent by volume. The magnesium oxide is slaked with water to form magnesium hydroxide which is added to the first solution portion, and the gas stream of high sulfur dioxide content is utilized to produce a sulfur-containing product.

INDRAVADAN S. SHAH
INVENTOR.

RECOVERY OF SULFUR DIOXIDE FROM WASTE GASES

BACKGROUND OF THE INVENTION

1. Field of the Invention

The invention relates to the removal and recovery of sulfur dioxide from waste gas streams, in order to prevent air pollution and to recover a valuable sulfur-containing product. The invention is typically applicable to the waste flue gas generated by the combustion of a sulfur-containing fuel, such as the flue gas discharged by a coal-burning steam power plant. The invention is applicable to the tail gas from a sulfuric acid production facility, in which case the recovered sulfur dioxide contained in the gas stream produced by processing of the magnesium sulfite-bisulfite solution will generally be recycled to the sulfuric acid production facility, to produce further sulfuric acid product. The process of the present invention may also be applied to the processing of the flue gas generated by the combustion of liquor, which is produced as a byproduct in the magnesia base pulp digestion process.

2. Description of the Prior Art

At present, the flue gases leaving a power plant or sulfuric acid plant stack are a major source of air pollution due to the presence of sulfur dioxide. The processing of waste gas streams to remove and recover sulfur dioxide is described in U.S. Pat. Nos. 1,212,199; 2,086,379, and 2,090,142. Disclosures relative to processing involving sulfite solutions include U.S. Pat. Nos. 2,210,405; 2,375,786; 2,413,321 and 3,085,858. Technology relative to the processing of sulfite solutions in wood pulp manufacture is disclosed in U.S. Pat. Nos. 716,330; 830,996; 1,097,781; 1,378,617; 1,499,898; 1,549,189; 1,637,353; 1,828,690; 2,042,477; 2,042,478; 2,047,627; 2,141,886; 2,147,161; 2,147,162; 2,190,612; 2,351,78); 2,572,929; 2,637,627; 2,872,289; and 3,273,961.

SUMMARY OF THE INVENTION

In the present invention, sulfur dioxide is recovered from waste gases and then regenerated in a concentrated form, so that valuable products such as liquid sulfur dioxide, sulfuric acid, elemental sulfur, etc., are produced. The process of the present invention removes up to 99percent or more of the sulfur dioxide from flue gas or other waste gas by absorption. Fly ash is also simultaneously scrubbed from the flue gas. The flue gas leaving the absorption system and discharged to the atmosphere is essentially free of sulfur dioxide and fly ash, and does not cause an air pollution problem. The absorbing liquor consists of an aqueous solution of magnesium sulfite which may also contain magnesium bisulfite. The absorption reaction takes place between magnesium sulfite, sulfur dioxide and water to form magnesium bisulfite in aqueous solution. The quantity of magnesium sulfite in the scrubbing and absorbing liquor is maintained in excess of the theoretical requirement to absorb essentially all of the sulfur dioxide.

The liquor derived from the scrubbing and absorption step now contains magnesium bisulfite, residual magnesium sulfite and fly ash. The liquor may also contain a small proportion of magnesium sulfate, in instances when sulfur trioxide is present in the original waste gas. The liquor is passed through a filter or centrifuge, where fly ash is removed from the solution. A major portion of the clear solution from the filter is returned to the absorption system, and the remaining solution preferably enters a reaction tank. Magnesium oxide or magnesium hydroxide is added to the solution in the reaction tank, and reacts with magnesium bisulfite to form further magnesium sulfite. Magnesium oxide will always be added in excess, in order to insure that all magnesium bisulfite is converted to magnesium sulfite. The magnesium sulfite has very limited solubility and will precipitate out of solution as solid crystals. The magnesium sulfate which may be formed will also precipitate out beyond the solubility limits. The resulting slurry is then sent through a filter or centrifuge, in which solid precipitate is separated from residual liquor.

The residual liquor is then returned to the absorption system, and combined with the major portion of the clear solution from the fly ash filter. Magnesium hydroxide is added to the combined solution, and reacts with the magnesium bisulfite derived from the clear solution to form further magnesium sulfite. The addition of magnesium hydroxide is controlled to maintain a desired magnesium sulfite concentration in the resulting solution, which is returned to the absorption system for further waste gas scrubbing.

The solid precipitate of magnesium sulfite crystals separated from the residual solution is then calcined, using either direct or indirect calcination. The magnesium sulfite decomposes at elevated temperature to yield solid magnesium oxide and sulfur dioxide gas. The resulting concentrated gas stream containing sulfur dioxide, which is discharged from the calciner, usually contains at least 10percent sulfur dioxide content by volume, and is utilized to make a suitable sulfur-containing product, such as liquid sulfur dioxide, sulfuric acid, or elemental sulfur.

The solid magnesium oxide is divided into two streams. A first stream is sent to the reaction tank for conversion of magnesium bisulfite to sulfite, and the balance of the magnesium oxide is slaked with water to form magnesium hydroxide, which is added to the combined solution passed to the absorption system.

In summary, the process includes:

1. Recovery of sulfur dioxide from a waste gas stream, such as the flue gas from a power boiler which burns sulfur containing coal or other fuel, by scrubbing the waste gas stream with an aqueous solution of magnesium bisulfite-magnesium sulfite. The sulfur dioxide is absorbed by reacting with the active chemical component, namely magnesium sulfite, in aqueous solution, to form magnesium bisulfite. 2. The resulting solution is divided into two portions. One portion is the recycle stream, and the other portion the bleed stream. Magnesium hydroxide is added to the recycle stream, and reacts with magnesium bisulfite to form magnesium sulfite. 3. An excess of magnesium oxide is added to the bleed stream, so that magnesium sulfite is formed and precipitated in the crystal form. 4. The precipitated magnesium sulfite and unreacted magnesium oxide are separated from the mother liquor, which is returned to the absorption system. 5. The mixture of magnesium sulfite and magnesium oxide are then calcined, to form solid magnesium oxide and a gas stream of high sulfur dioxide content, usually above 10percent by volume. 6. Some of the magnesium oxide is returned to the reaction tank, to precipitate magnesium sulfite as described in (3) supra. The remaining magnesium oxide is slaked with water to form magnesium hydroxide, which is added to the recycle stream according to (2) supra. 7. The gas stream of high sulfur dioxide content is utilized to produce a sulfur-containing product, such as sulfuric acid, elemental sulfur, etc. For the production of elemental sulfur, hydrogen or a gaseous hydrocarbon may be employed in direct reduction of sulfur dioxide to sulfur, or a portion of the sulfur dioxide may be converted to hydrogen sulfide by reaction with hydrogen or a gaseous hydrocarbon, with the hydrogen sulfide then being reacted with the balance of the sulfur dioxide in accordance with the Claus process, to form elemental sulfur.

In an alternative embodiment of the invention, a portion or all of the clear solution from the fly ash filter is concentrated by evaporation, and the resulting concentrated solution or slurry of magnesium bisulfite-sulfite is passed to a fluidized bed reactor. A fluid bed of solid magnesium oxide particles is maintained in ebullient or fluid motion and is heated by the injection of a fluid hydrocarbon fuel and heated air below or into the bed. The water content of the concentrated solution is completely evaporated in the fluid bed, and the solid salts are decomposed to yield further magnesium oxide and sulfur dioxide. A gas stream rich in sulfur dioxide is withdrawn from the top of the fluid bed and processed for sulfur recovery, while a side stream of solid magnesium oxide particles is withdrawn from the fluid bed and slaked with water to form magnesium hydroxide, which is added to the solution being recycled to the waste gas scrubbing and absorption system.

The system of the present invention provides several important advantages. Essentially all of the sulfur dioxide is removed from the waste gas stream. When the waste gas is a flue gas, entrained solids such as fly ash are also removed. Thus, air pollution is curtailed and prevented. The chemicals cost for the process is essentially negligible, since all of the magnesium oxide is recovered. The sulfur dioxide is regenerated in a concentrated form, suitable for the preparation of liquid sulfur dioxide, sulfuric acid, or any other suitable product.

It is an object of the present invention to provide an improved process for the removal of sulfur dioxide from waste gas stream.

Another object is to provide a process for the removal of sulfur dioxide and fly ash from flue gas stream.

A further object is to provide a process for recovering sulfur dioxide in concentrated form from waste gases containing a small proportion of sulfur dioxide.

An additional object is to prevent the pollution of the atmosphere by waste gases containing sulfur dioxide.

Still another object is to provide a process for recovering sulfur dioxide from waste gas streams which has a negligible cost and requirement for chemicals for the process.

Still a further object is to provide an improved process for scrubbing sulfur dioxide from waste gas streams using an aqueous absorbent solution containing magnesium sulfite.

These and other objects and advantages of the present invention will become evident from the description which follows.

DESCRIPTION OF THE DRAWINGS AND PREFERRED EMBODIMENTS

Figure 2:
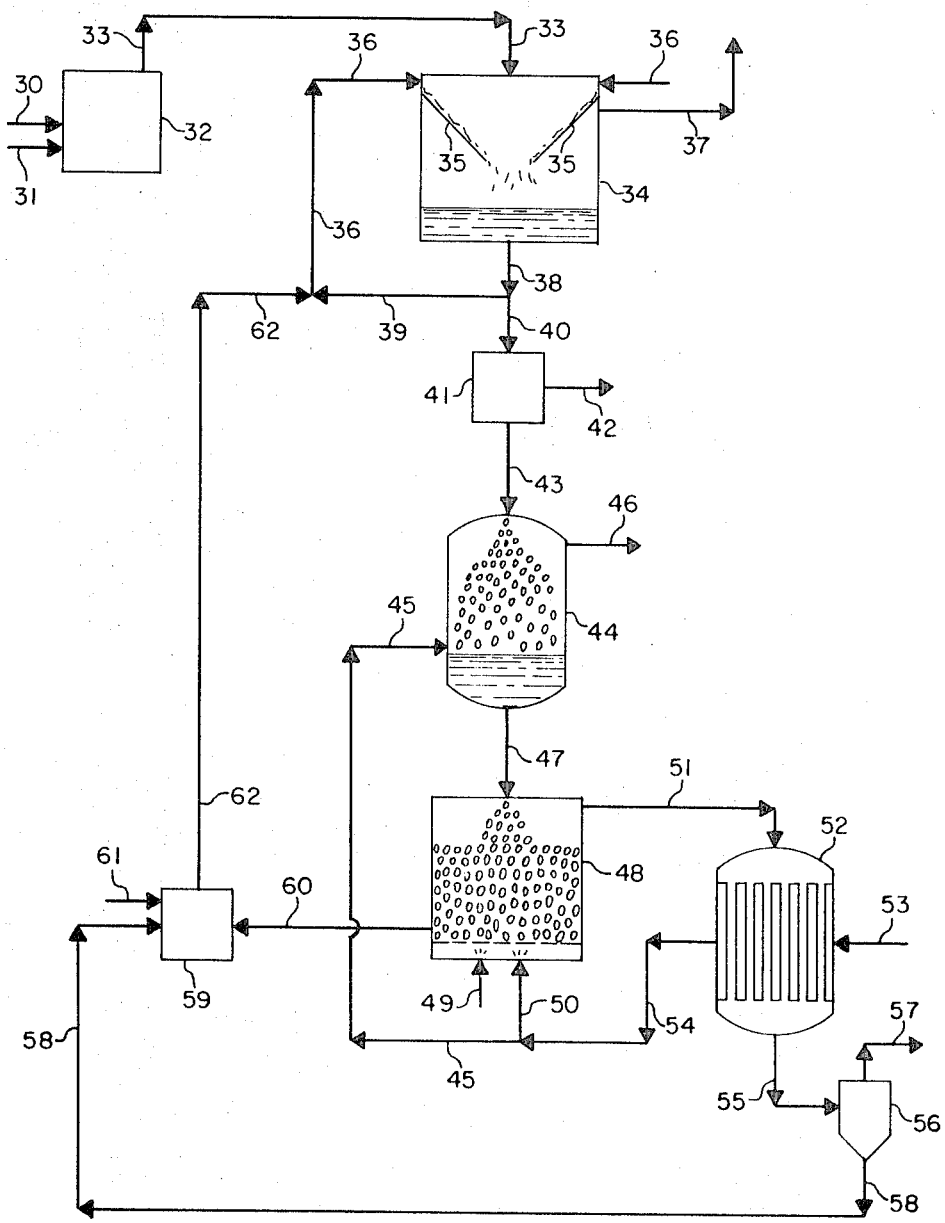

Referring now to the drawings,

FIG. 1 is a flowsheet of one embodiment of the invention, in which magnesium sulfite is precipitated and calcined for decomposition, and FIG. 2 is a flowsheet of an alternative embodiment of the invention, in which a portion of the scrubbing solution is concentrated by evaporation and passed to a fluidized bed reactor for decomposition.

Referring now to FIG. 1, a fuel stream 1 and combustion airstream 2 are passed into power boiler 3, which is typically a steam boiler in which the fuel stream 1 is burned to generate heat and vaporize water to form usable high pressure steam. Stream 1 may consist of coal, Bunker C residual oil, or any other suitable fuel which contains combustible components and sulfurous impurity. The combustion of fuel stream 1 with airstream 2 in unit 3 serves to generate a flue gas stream 4, which contains sulfur dioxide, fly ash, water vapor, residual free oxygen and inerts including carbon dioxide and nitrogen. Stream 4 is processed in accordance with the present invention, to produce a final gas stream of negligible sulfur dioxide and fly ash content which is suitable for discharge to the atmosphere without causing air pollution.

Stream 4 is scrubbed with an aqueous magnesium sulfite solution, which may also contain magnesium bisulfite and which absorbs sulfur dioxide and entrains fly ash particles from stream 4. The scrubbing of stream 4 is preferably attained in a venturi contactor, which attains uniform dispersion of the liquid phase into the gas phase and does not clog or plug due to fly ash deposition or buildup. Stream 4 is preferably passed centrally downwards through the top of venturi contactor-scrubber 5, and is accelerated to a high velocity by the downwardly converging inclined sidewalls 6. In instances when unit 5 is cylindrical, elements 6 will be in the form of a funnel or inverted truncated cone. The aqueous scrubbing and absorbent solution stream 7, which contains dissolved magnesium sulfite and may also contain dissolved magnesium bisulfite and entrained solid particles of magnesium sulfite, is admitted into the upper part of unit 5 adjacent to the upper terminus of each element 6. Stream 7 is at an initial temperature typically in the range of about 30° to 90° C., and typically contains about 0.5 to 2 percent magnesium sulfite content by weight. Stream 7 flows downwards across the upper surface of element 6, and in some instances stream 7 may be passed tangentially to the inner surface of unit 5, so as to flow downwards across element 6 with a whirling circular motion. In any case, stream 7 is projected inwards and transversely into the highly accelerated gas stream at the lower end of element 6, and the liquid phase is effectively and uniformly dispersed into the gas stream in the form of liquid droplets, with resultant rapid attainment of equilibrium between the phases. Consequently, absorption of sulfur dioxide into the liquid phase, formation of magnesium bisulfite in the liquid phase and entrainment of fly ash rapidly take place in unit 5. The scrubbed gas phase, now substantially free of sulfur dioxide and fly ash, separates from the liquid phase in the lower portion of unit 5 and is discharged to atmosphere via stream 8, which may extend to a flue gas disposal stack, not shown.

The liquid phase collected in the bottom of unit 5 now consists of an aqueous solution or slurry which contains residual magnesium sulfite, magnesium bisulfite and fly ash. In instances when stream 4 contains a small proportion of sulfur trioxide, the liquid phase in the bottom of unit 5 will also contain magnesium sulfate. A liquid stream 9 is withdrawn from the bottom of unit 5, and stream 9 is passed to filter or centrifuge unit 10, in which solid fly ash is separated from the liquid phase and discharged via stream 11. The clear solution stream 12 discharged from unit 10 is divided into stream 13, which is generally a major portion of stream 12 and is recycled as will be described infra, and stream 14 which is further processed to precipitate solid magnesium sulfite.

Stream 14 is passed into reaction tank 15, together with magnesium oxide stream 16, which is derived from within the process as will appear infra. Stream 16 reacts in unit 15 with magnesium bisulfite derived from stream 14, to form further magnesium sulfite. Sufficient magnesium oxide is added via stream 16 to react with all of the magnesium bisulfite, and excess magnesium sulfite precipitates from the solution in unit 15 in the form of solid magnesium sulfite crystals. The resultant slurry of solid magnesium sulfite crystals in saturated magnesium sulfite solution is discharged from unit 15 via stream 17, which is passed to filter or centrifuge unit 18 in which the solid magnesium sulfite phase is separated from the liquid solution phase. The resulting liquid solution phase stream 19 is recycled to absorption as will appear infra, while the solid magnesium sulfite crystals stream 20 is processed at elevated temperature to form a gas stream rich in sulfur dioxide, and solid magnesium oxide.

Stream 20 is passed into calciner or rotary kiln 21, which may be indirectly heated or more typically direct-fired, with fluid hydrocarbon fuel stream 22 and combustion air stream 23 being admitted into the solids discharge end of unit 21. The combustion of stream 22 in unit 21 serves to generate a highly elevated temperature generally in the range of 700° to 1,000° C. within unit 21, and the magnesium sulfite feed stream 20 is decomposed within unit 21 to yield sulfur dioxide gas and solid magnesium oxide. The resulting sulfur dioxide-rich gas 24 discharged from unit 21 is passed to further processing, not shown, for the preparation of liquid sulfur dioxide, sulfuric acid, elemental sulfur, or other sulfur-containing product. Stream 24 will contain at least 5 percent by volume of sulfur dioxide content, and usually contains more than 10 percent sulfur dioxide content by volume.

The solid magnesium oxide stream 25 discharged from unit 21 is now divided into stream 16, which is recycled to unit 15 as described supra, and stream 26, which is passed to slaker or slaking system 27, in which water stream 28 is employed to slake the magnesium oxide and form magnesium hydroxide. The resulting magnesium hydroxide stream 29 withdrawn from unit 27 is combined with streams 13 and 19 to form stream 7. The magnesium hydroxide stream 29 serves to convert magnesium bisulfite in stream 13 into magnesium sulfite.

Referring now to FIG. 2, an alternative procedure within the scope of the present invention is illustrated. The initial stages of the process in FIG. 2 are similar to FIG. 1, and therefore these stages will only be briefly described. Sulfur-containing fuel stream 30 and combustion airstream 31 are reacted in combustion unit 32, which is typically a steam power boiler. The generated flue gas stream 33 contains sulfur dioxide and entrained fly ash which are removed in accordance with the present invention. Stream 33 is passed into the top of gas scrubbing and absorption unit 34, and is accelerated by converging venturi baffles 35. Scrubbing liquid stream 36, which consists of an aqueous solution containing magnesium sulfite, is passed downwards on the upper surface of units 35 and is projected into the highly accelerated gas stream at the lower ends of sections 35. The gas stream is thus scrubbed with droplets of the liquid solution, in unit 34, and the resultant scrubbed gas stream, now substantially devoid of sulfur dioxide and fly ash, is discharged from unit 34 via stream 37.

A liquid solution or slurry stream 38 is removed from the bottom of unit 34. Stream 38 contains residual magnesium sulfite, magnesium bisulfite formed by the reaction of absorbed sulfur dioxide with magnesium sulfite, and entrained solid fly ash. Stream 38 is divided into stream 39, which is recycled to absorption as will appear infra, and stream 40, which is further processed to recover magnesium oxide values and a gas stream rich in sulfur dioxide. Stream 40 is passed through solids filter or centrifuge unit 41, to remove solid fly ash which is discharged via stream 42. The clear liquid solution stream 43 discharged from unit 41 now contains magnesium sulfite and magnesium bisulfite in aqueous solution. Stream 43 is now sprayed or otherwise passed into evaporator 44, for evaporation of a portion of the liquid water from the solution by direct contact with hot airstream 45, which is admitted into the lower portion of unit 44 and flows upwards countercurrent to the falling liquid droplets. Cooled airstream 46 of high water vapor content is discharged from the upper part of unit 44 to atmosphere.

A highly concentrated aqueous solution or slurry collects in the bottom of unit 44, and is removed via stream 47, which passes into fluidized bed reactor 48. A hot fluidized bed consisting principally of magnesium oxide particles is maintained in turbulent or ebullient motion within unit 48, by injecting a fluid hydrocarbon fuel stream 49 and preheated airstream 97 50 into the bottom or lower portion of the unit 48. The combustion of stream 49 with stream 50 within unit 48 serves to maintain the fluidized bed in unit 48 at a highly elevated temperature, generally in the range of about 700° to 1,000° C. Stream 47 is dispersed into the top of the bed in unit 48, and the water content of stream 47 is rapidly vaporized, with deposition of solid magnesium sulfite and magnesium bisulfite in the upper part of the bed. The deposited magnesium salts are decomposed in the bed due to the elevated temperature, with resultant addition of magnesium oxide to the fluid bed and evolution of sulfur dioxide into the gas phase rising through the bed.

A hot gas stream 51 is withdrawn from the upper part of unit 48, and stream 51 contains sulfur dioxide and water vapor in addition to gaseous combustion products derived from the reaction of streams 49 and 50. Stream 51 is cooled in heat exchanger 52, with concomitant condensation of water vapor to liquid water, by heat exchange with ambient airstream 53, which is passed through the shell of unit 52 external to the heat exchange tubes and is thereby heated to a temperature generally in the range of 100° to 500° C. The resultant hot airstream 54 discharged from the shell of unit 52 is divided to form streams 50 and 54, which are utilized as described supra.

The process gas stream 55 removed from the bottom of unit 52 now contains entrained droplets of liquid water, which are removed by passing stream 55 into gas-liquid separator 56, which is any suitable cyclonic or baffled apparatus for separating entrained liquid from a gaseous stream. The water-free gas stream 57 discharged from unit 56 is now rich in sulfur dioxide, and is utilized to produce any desired sulfur-containing product, such as liquid sulfur dioxide, sulfuric acid or elemental sulfur, by any conventional procedure. Thus, if liquid sulfur dioxide is a desired product, stream 57 may be cooled by refrigeration to selectively condense liquid sulfur dioxide. When sulfuric acid is the desired product, stream 57 will generally be passed to a conventional sulfuric acid production facility which produces sulfuric acid by catalytic oxidation of sulfur dioxide to sulfur trioxide followed by absorption of the sulfur trioxide in concentrated sulfuric acid or oleum.

The liquid water phase separated from the gas stream in unit 56 is removed via stream 58, which is preferably utilized within the process as slaking water in the magnesium oxide slaker or slaking system 59. Magnesium oxide stream 60 is passed from the lower portion of the fluid bed in unit 48 to slaker 59, and is slaked with water stream 58 to form magnesium hydroxide. Additional makeup water may be added to unit 59 as required via stream 61. The resulting magnesium hydroxide stream 62 withdrawn from unit 59 is combined with stream 39 to form stream 36. The addition of stream 62 to stream 39 serves to convert magnesium bisulfite in stream 39 to magnesium sulfite.

Numerous alternatives within the scope of the present invention will occur to those skilled in the art. The ranges of process variables such as temperature enumerated supra constitute preferred embodiments for optimum utilization of the process concepts of the invention, and the process of the present invention may be practiced outside of these ranges in suitable instances. Units 3 or 32 may typically consist of any type of facility or process which generates a waste gas stream containing sulfur dioxide. Thus, the invention is applicable to sulfuric acid production facilities, which generate a tail gas stream containing sulfur dioxide. In this case, streams 4 or 33 could consist of a tail gas discharged from the sulfur trioxide absorption unit, and the tail gas containing sulfur dioxide would be free of entrained solid particles. In such instances, when the waste gas is free of entrained solids, units 10 or 41 would be omitted. If units 3 or 32 are sulfuric acid production facilities, the main feed streams to the facility will consist of a sulfur-containing material such as elemental sulfur, pyrites or other sulfide ore, sludge acid from petroleum refining, hydrogen sulfide, etc., together with process air, and in this case the final process gas stream 24 or 57 which is rich in sulfur dioxide may be passed to the respective sulfuric acid production facility 3 or 32. Units 5 and 34 may consist of any suitable device for attaining intimate contact scrubbing of a gas stream with a liquid absorbent solution, and in some cases a plurality of units or stages may be provided in series, with countercurrent flow of the gas and liquid streams through the stages. Unit 15 will generally be provided with a suitable internal agitation and mixing device such as a rotary stirrer, not shown. The calciner 21 may be any suitable elevated temperature solids heater, and in some cases a fluidized bed unit similar to reactor 48 may be provided instead of calciner 21. Referring to FIG. 2, unit 44 may consist of any suitable liquid evaporator, and in some instances unit 44 will consist of a falling film evaporator provided with vertical internal tubes, with the liquid stream 43 flowing down the inner surface of the tubes as a thin liquid film and hot airstream 45 flowing upwards through the tubes. In this case, the tubes will generally be externally heated by high pressure steam or other suitable heating fluid. Finally, in some cases unit 48 may be replaced by a suitable rotary kiln or the like, or any suitable apparatus unit for dehydrating and roasting a slurry.

An example of application of the process of the present invention to a typical sulfur dioxide-containing waste gas stream derived from a commercial facility-sulfuric acid production will now be described.

EXAMPLE

The process of the present invention as shown in FIG. 1 was applied to the treatment of the waste tail gas stream from a commercial sulfuric acid production facility. Following are the flow rates of components in the major process streams.

FLOW RATE OF COMPONENT, KG./MIN.

| Stream No. | Nitrogen plus oxygen | Sulfur dioxide | Water | Net Mg as MgO | Magnesium sulfite | Temp., °C. |
|---|---|---|---|---|---|---|
| 4 | 1,590 | 17.2 | | | | 91 |
| 8 | 1,590 | | 69.3 | | | 38 |
| 14 | | 17.2 | 383 | 6.1 | | 38 |
| 16 | | | | 4.6 | | |
| 19 | | | 383 | | | |
| 20 | | | | | 28.0 | |
| 24 | | 17.2 | | | | |
| 25 | | | | 10.7 | | |
| 26 | | | | 6.1 | | |
| 28 | | | 69.3 | | | |
| 29 | | | 452 | 6.1 | | |

NOTE.—The calciner 21 was operated at about 950° C.

I claim:

1. A process for the recovery of sulfur dioxide from a waste gas stream containing sulfur dioxide which comprises scrubbing said waste gas stream with an aqueous solution free of solid magnesium sulfite and containing in the range of about 0.5 percent to 2.0 percent by weight of dissolved magnesium sulfite, said aqueous solution being at an initial temperature in the range of about 30° to 90° C., whereby sulfur dioxide is absorbed from said waste gas stream into said aqueous solution and reacts with dissolved magnesium sulfite to form magnesium bisulfite, dividing the resulting aqueous solution containing magnesium bisulfite and residual magnesium sulfite into a first portion and a second portion, adding magnesium hydroxide to said first solution portion, whereby magnesium bisulfite is converted to magnesium sulfite in said first solution portion, recycling the resulting first solution portion to scrubbing of said waste gas stream as said aqueous solution, adding magnesium oxide to said second solution portion, whereby magnesium bisulfite is converted to magnesium sulfite, separating precipitated solid magnesium sulfite from the resulting solution, adding the resulting solution of low magnesium sulfite content to said first solution portion, calcining said solid magnesium sulfite at elevated temperature to produce magnesium oxide and a gas stream of high sulfur dioxide content, slaking a portion of said magnesium oxide with water to produce said magnesium hydroxide, recycling the balance of said magnesium oxide by addition to said second solution portion, and preparing a sulfur-containing product from said gas stream of high sulfur dioxide content.

2. The process of claim 1, in which said waste gas stream is the tail gas from the sulfuric acid production facility, and said gas stream of high sulfur dioxide content is passed to said sulfuric acid production facility and utilized to produce sulfuric acid.

3. The process of claim 1, in which said waste gas stream is a flue gas derived from the combustion of a sulfur-containing fuel, said flue gas containing solid fly ash which is entrained in said resulting aqueous magnesium sulfite-bisulfite solution, and said entrained solid fly ash is removed from said resulting aqueous solution prior to dividing said resulting aqueous solution into a first portion and a second portion.

4. A process for the recovery of sulfur dioxide from a waste gas stream containing sulfur dioxide which comprises scrubbing said waste gas stream with an aqueous solution free of solid magnesium sulfite and containing in the range of about 0.5 to 2.0 percent by weight of dissolved magnesium sulfite, said aqueous solution being at an initial temperature in the range of about 30° to 90° C., whereby sulfur dioxide is absorbed from said waste gas stream into said aqueous solution and reacts with dissolved magnesium sulfite to form magnesium bisulfite, dividing the resulting aqueous solution containing magnesium bisulfite and residual magnesium sulfite into a first portion and a second portion, adding magnesium hydroxide to said first solution portion, whereby magnesium bisulfite is converted to magnesium sulfite in said first solution portion, recycling the resulting first solution portion to scrubbing of said waste gas stream as said aqueous solution, concentrating said second solution portion by evaporation in direct contact with a first hot airstream, passing the concentrated second solution portion to a fluidized bed of solid magnesium oxide particles in which a fluid hydrocarbon fuel is burned with a second hot airstream, withdrawing magnesium oxide from the lower portion of said bed, slaking said withdrawn magnesium oxide with water to produce said magnesium hydroxide, withdrawing a hot flue gas stream containing water vapor and a high proportion of sulfur dioxide from the top of said bed, cooling said hot gas stream by indirect heat exchange with a third airstream, whereby said third airstream is heated and water vapor is condensed from the cooled gas, separating condensed liquid water from the cooled gas stream of high sulfur dioxide content, and dividing the resulting heated third airstream to form said first hot airstream and said second hot airstream.

5. The process of claim 4, in which said waste gas stream is the tail gas from a sulfuric acid production facility, and said gas stream of high sulfur dioxide content is passed to said sulfuric acid production facility and utilized to produce sulfuric acid.

6. The process of claim 4, in which said waste gas stream is a flue gas derived from the combustion of a sulfur-containing fuel, said flue gas containing solid fly ash which is entrained in said resulting aqueous magnesium sulfite-bisulfite solution, and said entrained solid fly ash is removed from said resulting aqueous solution prior to dividing said resulting aqueous solution into a first portion and a second portion.

* * * * *